United States Patent
Iverson et al.

(10) Patent No.: US 9,964,456 B2
(45) Date of Patent: May 8, 2018

(54) SYSTEM FOR ESTIMATING TOTAL POWER INPUT BY A BICYCLIST USING A SINGLE SIDED POWER METER SYSTEM

(71) Applicant: Saris Cycling Group, Inc., Madison, WI (US)

(72) Inventors: Jeffery T. Iverson, Madison, WI (US); Benjamin R. Bass, Madison, WI (US); Edward M. Watson, Madison, WI (US)

(73) Assignee: Saris Cycling Group, Inc., Madison, WI (US)

( * ) Notice: Subject to any disclaimer, the term of this patent is extended or adjusted under 35 U.S.C. 154(b) by 122 days.

(21) Appl. No.: 14/941,993

(22) Filed: Nov. 16, 2015

(65) Prior Publication Data
US 2016/0136481 A1  May 19, 2016

Related U.S. Application Data

(60) Provisional application No. 62/081,302, filed on Nov. 18, 2014.

(51) Int. Cl.
| | |
|---|---|
| *A63B 24/00* | (2006.01) |
| *G01L 3/24* | (2006.01) |
| *B62K 3/00* | (2006.01) |
| *B62M 3/08* | (2006.01) |
| *B62J 99/00* | (2009.01) |

(52) U.S. Cl.
CPC ............ *G01L 3/247* (2013.01); *B62K 3/00* (2013.01); *B62J 2099/002* (2013.01); *B62M 3/08* (2013.01)

(58) Field of Classification Search
CPC ........ A63B 24/0062; A63B 2024/0071; G01L 3/24; G01L 19/147; G06Q 10/0639; B62K 3/00; B62J 2099/002; B62M 3/08
See application file for complete search history.

(56) References Cited

U.S. PATENT DOCUMENTS

| | | | |
|---|---|---|---|
| 8,006,574 B2 | 8/2011 | Meyer | |
| 8,011,242 B2 | 9/2011 | O'Neill et al. | |
| 8,327,723 B2 | 12/2012 | Rouderges et al. | |
| 2002/0052258 A1* | 5/2002 | Meggiolan | B62J 11/00 474/70 |
| 2007/0170688 A1* | 7/2007 | Watson | B62J 99/00 280/260 |
| 2011/0087446 A1 | 4/2011 | Redmond et al. | |
| 2012/0017701 A1* | 1/2012 | Meyer | G01L 3/1478 73/862.08 |
| 2012/0042725 A1* | 2/2012 | Cote | B62J 99/00 73/488 |

(Continued)

OTHER PUBLICATIONS

"Speed & Acceleration", Analytic Cycling, http://www.analyticcycling/DiffEqMotionFunctions_Page.htm, Mar. 29, 2016.

(Continued)

*Primary Examiner* — David Bolduc
(74) *Attorney, Agent, or Firm* — Boyle Fredrickson, S.C.

(57) ABSTRACT

A system is provided for determining total exerted power value that is determined based on power measured at only one side of a bicycle by determining a side-to-side pedaling power asymmetry and estimating the total exerted power as a function of values of the one-sided power measurement and the side-to-side pedaling power asymmetry.

20 Claims, 5 Drawing Sheets

(56) References Cited

U.S. PATENT DOCUMENTS

| | | | |
|---|---|---|---|
| 2012/0166105 A1* | 6/2012 | Biermann | A63B 24/0062 |
| | | | 702/43 |
| 2012/0214646 A1 | 8/2012 | Lull et al. | |
| 2012/0330572 A1* | 12/2012 | Longman | G01L 3/247 |
| | | | 702/44 |
| 2013/0104650 A1 | 5/2013 | Bailey et al. | |
| 2013/0205916 A1* | 8/2013 | Kodama | A63B 24/0062 |
| | | | 73/862.69 |
| 2014/0165744 A1 | 6/2014 | Lull et al. | |
| 2014/0182393 A1* | 7/2014 | Heinkel | B62M 3/08 |
| | | | 73/862.28 |
| 2014/0200835 A1* | 7/2014 | Carrasco Vergara | G01L 3/00 |
| | | | 702/42 |
| 2014/0283622 A1* | 9/2014 | Namiki | B62M 3/00 |
| | | | 73/862.53 |
| 2014/0297070 A1* | 10/2014 | Gros | B62M 6/50 |
| | | | 701/22 |

OTHER PUBLICATIONS

"SRAM RED 2012 Quarq Power Meter In-Depth Review", http://www.dcrainmaker.com/2012/05/sram-red-2012-quarq-power-memter-review.html.
PCT/US15/61000, International Search Report and Written Opinion, dated Mar. 29, 2016, 9 pages.

* cited by examiner

SYSTEM FOR ESTIMATING TOTAL POWER INPUT BY A BICYCLIST USING A SINGLE SIDED POWER METER SYSTEM

CROSS-REFERENCE TO RELATED APPLICATION

This application claims priority from U.S. Provisional Patent Application No. 62/081,302, which was filed on Nov. 18, 2014, the subject matter of which is incorporated by reference in its entirety.

BACKGROUND OF THE INVENTION

1. Field of the Invention

This invention relates generally to power meters used to measure the power exerted on a bicycle. More particularly, the present invention is a single sided power meter that measures the power exerted on one side of the bicycle and other bicycle operating parameters, and then estimates the total power exerted on the bicycle using the measured single-sided power and the other measured parameters.

2. Discussion of the Related Art

Many individuals desire systems that monitor performance during an exercising session. This is especially true for competitive athletes, who desire a quantifiable measure of their performance. A number of force and power meters are used in conjunction with bicycles. Many of these power meters measure power at a single location, such as at the chain ring or the hub of the driven wheel, or measure the forces applied to both sides of the bicycle individually, such as at the pedals or the crank arms. In these approaches, all of the power/force is measured in the direct load path of the bicycle drivetrain. However, in the latter type of power measurement system, it can be expensive and burdensome to install and calibrate power meters on both sides of the bicycle or to measure total power in the direct load path. As a result, single sided power measurement devices have been developed. Typical single sided power measurement devices measure power applied to one side of the power input system, such as using one of the pedals or one of the crank arms, and then simply by double the power measured on the single side. This gives an estimate of the total power derived from both legs under a symmetric assumption, which assumes that both legs are providing the same amount of power. This method of calculating total power, while relatively low in cost, is oftentimes imprecise in that there can be significant differences in power input from one side to the other. That is because even highly trained bicyclists pedal with at least some amount of asymmetry based on factors such as strength and coordination differences between dominant and non-dominant legs and fatigue characteristics. By using the symmetric assumption, seemingly small errors can be increasingly worsened by a factor of two and potentially provide significant imprecision of the overall estimated power value.

There is thus a need for a single-sided power meter, which is relatively low in cost, which is able to provide a heightened level of accuracy in estimating the input forces applied to the bicycle by the bicyclist.

SUMMARY OF THE INVENTION

The present invention is directed to a system for determining total exerted power value that is based on power measured at only one side of a bicycle without using a symmetrical assumption about left and right side power output of a bicyclist, but instead is configured to determine actual asymmetric characteristics and estimate total exerted power as a function of the magnitude of asymmetry. A partial power value may be determined by measuring power at only one side of the bicycle, an asymmetry value may be determined by measuring a differential acceleration value between left and right pedal strokes as a side-to-side acceleration differential value, a power correction value may be determined that corresponds to asymmetry value, and an estimated total exerted power value may be determined as a function of the partial power value and the power correction value.

According to one aspect of the invention, pedal balance is measured to and used as a prediction characteristic to determine total exerted power while only measuring power from a single side of a bicycle.

According to another aspect of the invention, total power of a bicyclist is estimated by determining a partial power value corresponding to power exerted by only one of a left leg and a right leg of a bicyclist. An asymmetry value is determined that corresponds to a difference between power exerted by the left and right legs of the bicyclist. A power correction value is determined that corresponds to the asymmetry value. The partial power and correction values are used to determine the total power value.

According to another aspect of the invention, determining the asymmetry value includes determining a side-to-side acceleration differential value. This may be done by measuring acceleration values for left-side pedal strokes and right side-side pedal strokes, which are evaluated to determine a differential value between the left-side pedal strokes and right-side pedal strokes. The side-to-side acceleration differential value may be determined as the differential value between the left-side pedal strokes and right-side pedal strokes during a single pedal revolution.

According to another aspect invention, the side-to-side acceleration differential value may be determined by measuring acceleration at only one of the left and right legs of the bicyclist during the single pedal revolution. The leg of which acceleration is measured defines an evaluated leg and the other defines a non-evaluated leg. The side-to-side acceleration differential value may be determined directly for the evaluated leg by measuring the acceleration value of the evaluated leg during a downstroke of the evaluated leg. Acceleration may be indirectly determined for the non-evaluated leg by measuring acceleration of the evaluated leg during a downstroke of the evaluated leg during the single pedal revolution. To indirectly determine the acceleration value of the non-evaluated leg, acceleration of the evaluated leg during an upstroke can be measured during the single pedal revolution. The acceleration values of the evaluated and non-evaluated legs are compared to determine the side-to-side acceleration differential value.

According to another aspect of the invention, the measuring of acceleration of the evaluated leg includes measuring acceleration of at least one of a crank arm and a pedal at a side of the bicycle at which the evaluated leg of the bicyclist is positioned.

According to another aspect of the invention, the partial power value is determined by evaluating a signal from a power sensor arranged at a shoe of the bicyclist. The power sensor arranged at the shoe of the bicyclist may be incorporated into at least one of an insole of the shoe and a cleat of the shoe.

According to another aspect of the invention, the partial power value is determined by evaluating a signal from a power sensor arranged at a bottom bracket of the bicycle, which may include measuring twist of a bottom bracket spindle.

In accordance with another aspect of the present invention, power applied by one of the bicyclist's legs is measured. Then, rather than merely doubling the measured power to arrive at an estimate of total power, a modifier is applied to the measured power using one or more measured parameters other than power, such as angular velocity and/or acceleration, that compares the downstroke maximum speed of both the left and right legs of the bicyclist. The measured power is modified using data from the entire revolution, including both the useful power on the downstroke and drag experienced during the upstroke (in this regard, an assumption is applied that drag on the upstroke is the same on both the right and left sides). Using the data relating to acceleration and/or angular velocity from both sides, the total applied power can be relatively accurately estimated from the power measurement on only one side.

Various other features, objects, and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
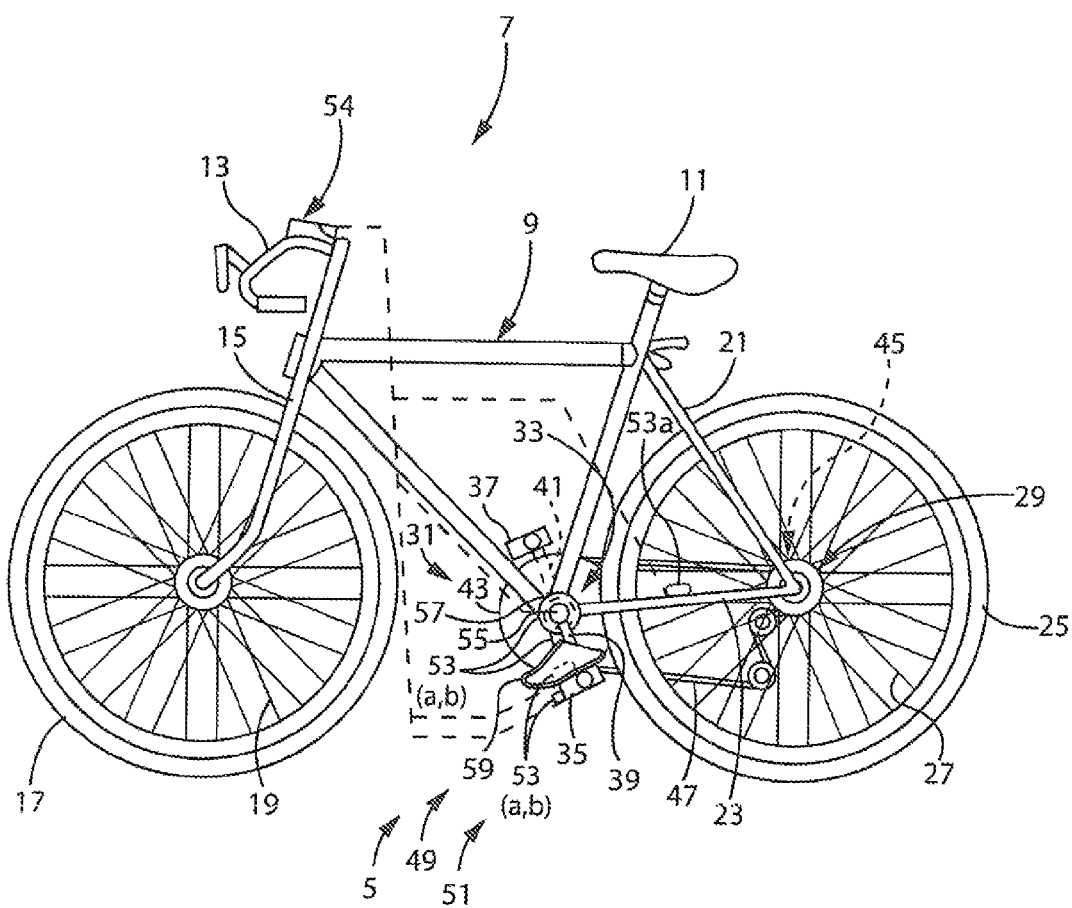
FIG. 1 is a partially schematic side elevation view of a bicycle incorporating the single sided power meter system in accordance with the present invention.

Specific embodiments of the present invention will be described by the following non-limiting examples which will serve to illustrate various features of the invention. With reference to the drawing figures in which like reference numerals designate like parts throughout the disclosure, representative embodiments of the present invention are shown as a single sided power meter system 5 in FIG. 1 which is configured to determine total power exerted by bicyclist based on power measured at only one side of a bicycle by determining a side-to-side pedaling power asymmetry and estimating the total exerted power as a function of values of the one-sided power measurement and the side-to-side pedaling power asymmetry.

Referring now to FIG. 1, the system 5 is arranged on a bicycle 7 that has a frame 9 that supports a seat 11, handlebars 13, and front forks 15 that support a front wheel 17 that may include spokes 19. The frame 9 also has a back portion with seat stays 21 and chain stays 23 that together support a back wheel 25, which may include spokes 27 connected to a hub 29. A drivetrain 31 defines a load path through which power is transferred from the bicyclist to the back wheel 25 for propelling bicycle 7. Drivetrain 31 includes a crank assembly 33 with left and right pedals 35, 37 that are connected to left and right crank arms 39, 41, respectively. The crank arms 39, 41 are arranged to rotate a crank chain ring 43 that is coupled to a driven sprocket 45, which is typically one of several sprockets in a stack or cone of differently-sized sprockets, by a chain 47 or belt (not shown). The driven sprocket 45 is operably coupled to the hub 29 that carries and rotates the back wheel 25 by way of the spokes 27 or a solid disc (not shown).

Still referring to FIG. 1, single sided power meter system 5 includes a single sided power measuring system 49 and a rotational characteristic measuring system 51. Sensors 53 of the power and rotational characteristic measuring systems 49, 51 are configured for respectively measuring characteristics that correspond to power and rotational characteristics, such as force and angular velocity or acceleration, or changes in such characteristics. A computer 54 operably communicates with the single sided power meter system 5 for evaluating signals and/or data from the power and rotational characteristic measuring systems 49, 51 to determine total power, as explained in greater detail elsewhere herein. The computer 54 may representatively be a JOULE or JOULE OPS cycling computer available from CycleOps POWER of Madison, Wis., USA, or any other type of bicycle computer or suitable processing device. Computer 54 includes circuitry with a processor that is configured to execute particular applications that operate in accordance with a computer software program that is stored in memory. An antenna or port is operably connected to the circuitry for connecting the computer 54 to single sided power meter system 5 to receive the signals and/or data from the sensors 53. Sensor(s) 53 of single sided power measuring system 49 defines power sensor(s) 53a and sensor(s) 53 of rotational characteristic measuring system 51 defines rotational characteristic sensor(s) 53b. Both power and rotational characteristic sensors 53a, 53b and other components of power and rotational characteristic measuring systems 49, 51 can be those available in various power meters, trainers, and other performance monitoring systems available from PowerTap and/or CycleOps POWER, or from other sources as known in the art.

Still referring to FIG. 1, power sensor(s) 53a of single sided power measuring system 49 is configured for single sided power measurement and therefore measure power exerted by only one leg of a bicyclist or at one side of the bicycle 7, to define at least part of a single sided power meter. Power sensor 53a may, for example, include one or more strain gauges arranged at a respective component to sense or measure power characteristics such as force applied to the component, which may include sensing twist or torque, compression, and/or flexion. The component can be any of a variety of standard power input components to which power meters or power sensors 53a are typically mounted. For instance, power sensors 53a could be mounted to any of the pedals 35, 37, crank arms 39, 41, a bottom bracket spindle 55 of bottom bracket 57, or the like. Power sensors 53a of single sided power measuring system 49 may also be incorporated in one or both of the shoes 59 of a bicyclist, such as integrated directly into the shoes 59, shoe clips or cleats, or insoles of the shoes 59. It is understood, however, that power applied to one side of a bicycle can be measured by power sensors 53a on the bicycle itself or on various components of the drivetrain, including but not limited to the crank arm, pedal, bottom bracket, bottom bracket spindle (or crank spindle), bottom bracket bearing cups, any intermediary mounted between drivetrain components, or any additional part mounted between or within such drivetrain components. It is further understood that measuring power applied to the bicycle itself can include measuring power at components of frame 9 of bicycle 7, which may include mounting power sensor(s) 53a on chain stay(s) 23 or other frame component to measure compression of the chain stay(s) 23 (FIG. 1) as an indicator of power.

Figure 2:
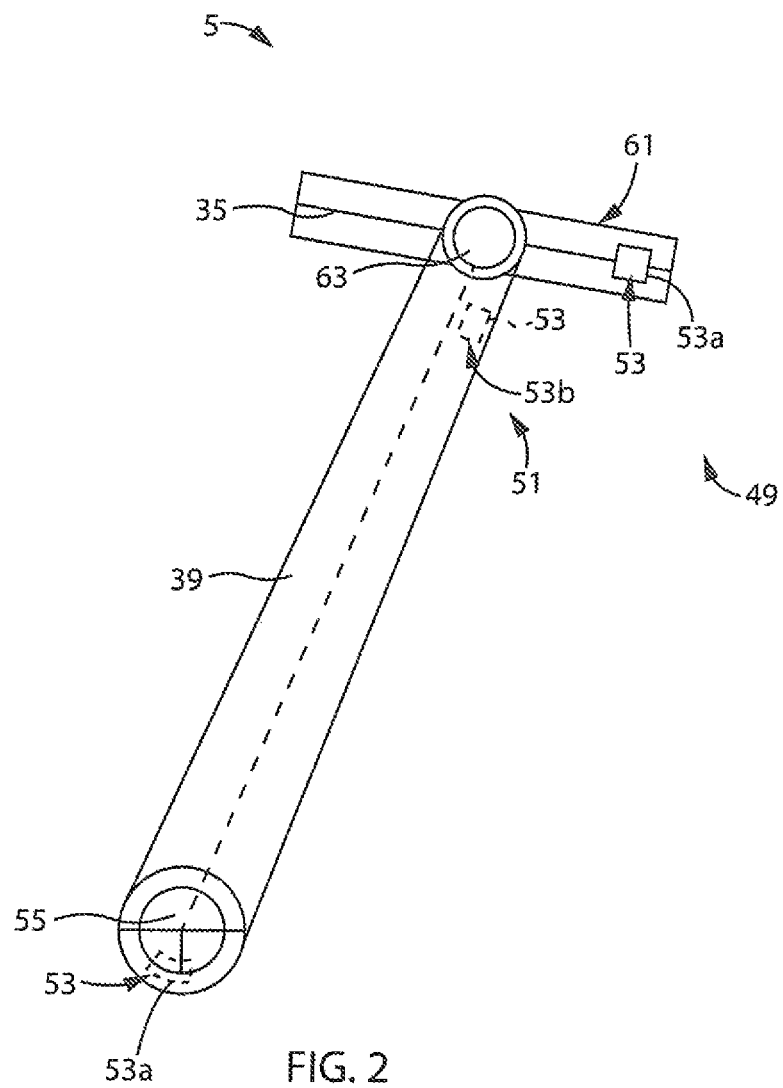
FIG. 2 is a side elevation view of a representative single sided power meter system where the power is measured in a pedal of a bicycle.

Referring now to FIG. 2, single sided power meter system 5 is shown configured for use in a bicycle pedal 35 that is connected to a crank arm 39. The single sided power meter system 5 includes power sensor 53a that measures the power or force exerted on the pedal 35 by a bicyclist. As shown, the power sensor 53a is located on a body 61 of the pedal 35, although the power sensor 53a could be located elsewhere, for instance, in a pedal shaft 63 that connects the pedal 35 to the crank arm 39 or within the pedal body 61. As discussed elsewhere herein typically, the power sensor 53a will use strain gauge(s) to measure the forces applied to the pedal 35, although other types of sensors may be used. A representative pedal-type power meter and corresponding sensors of the type illustrated in FIG. 2 are shown and described in US Patent Application Publication No. US-2012/0166105 dated Jun. 28, 2012, the entire contents of which are hereby incorporated by reference. Toward the bottom of FIG. 2, another implementation of single sided power meter system 5 is shown configured to measure power at bottom bracket spindle 55. Power sensor(s) 53a is mounted to bottom bracket spindle 55 to measure twist in the bottom bracket spindle 55 that is pedaled by the leg a bicyclist that is opposite the chain ring 43, typically the left leg. The twist measurement by power sensor 53a of bottom bracket spindle 55 corresponds to power applied by the left leg.

Figure 3:
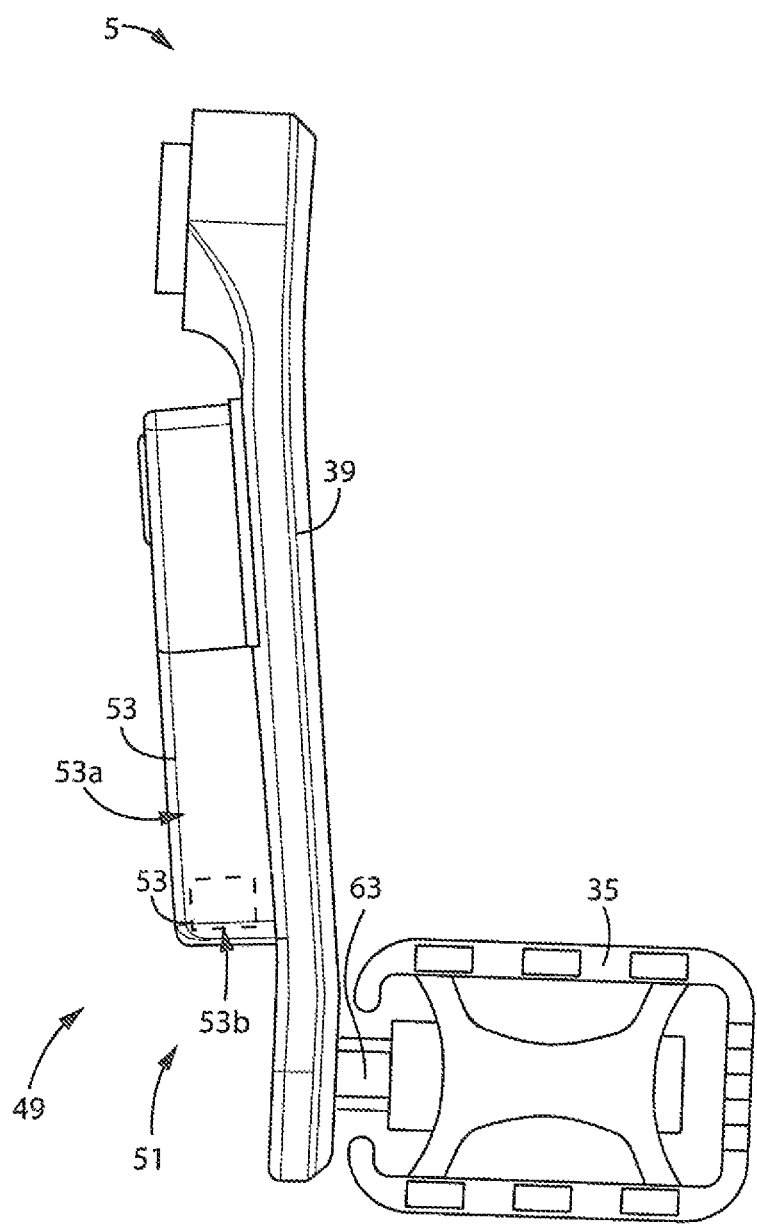
FIG. 3 is an isometric view of a representative single sided power meter system where the power is measured in the crank arm of a bicycle.

Referring now to FIG. 3, single sided power meter system 5 is shown configured to be used with the crank arm 39 of the bicycle 7 (FIG. 1). Again, the single sided power meter system 5 includes power sensor 53a with a plurality of strain gauges, with the strain gauges arranged to measure the force exerted on the crank arm 39. Other types of sensors could also be used to measure the power or forces acting upon the crank arm 39 as known in the art. A representative crank arm-type power meter of the type illustrated in FIG. 3 is shown and described in US Patent Application Publication No. US-2012/0214646 dated Aug. 23, 2012, the entire contents of which are hereby incorporated by reference.

In addition to measuring forces relating to the application of power or force exerted on the power sensor 53a, the single sided power meter system 5 also includes appropriate components of the rotational characteristic measuring system 51 (FIG. 1) that measures other parameters, for instance, rotational characteristic sensor 53b. Rotational characteristic sensor 53b is configured for measuring characteristics of pedal rotation such as the cadence, angular velocity, acceleration, momentum, angular momentum, orientation, or position of the pedal 35, as shown in FIG. 2, or the crank arm 39, as shown in FIG. 3. These additional measured parameters can then be employed to estimate the total forces applied to both pedals 35, 37 or both crank arms 39, 41 while only collecting data from a single side of the bicycle 7. To measure such additional parameters, additional components or rotational characteristic sensor(s) 53h may be included in a housing 65 of the single sided power meter system 5. For instance, the rotational characteristic sensor(s) 53b can include an external encoder, a reed switch, an accelerometer, a gyroscope, or any other component as known in the art could be included in the single sided power meter system 5 to measure other parameters relating to revolution of the crank. Alternatively, the rotational characteristic sensor(s) 53b for measuring other parameters may be mounted separately from the power sensor 53a, e.g. contained within one or more separate housings or mounted separately in some other manner in an appropriate location on the bicycle 7.

In practice, the measurements of the additional parameters are taken at high frequency throughout every crank revolution with the rotational characteristic sensor(s) 53b. Representatively, while the power meter system 5 measures forces relating to power application throughout the entire pedal stroke, the present invention employs the portion of the measured forces relating to power that are applied during the downstroke of each revolution the side of the bicycle 7 where the power meter system 5 is mounted, as this is the portion of the crank revolution where the majority of power is applied. That is, in addition to measuring power-related forces during the pedal downstroke, the additional parameter(s) are simultaneously measured during this downstroke. The additional parameter(s) are also measured during the upstroke, as this represents the downstroke of the opposite side where the power meter system 5 is not mounted. The value(s) of the additional parameter(s) during the downstroke are then compared to the value(s) of the additional parameter(s) during the upstroke. In the event that these values are equivalent, it can be assumed that the force exerted is equal on both sides. Where the values are not equal, the differences between the second parameter values are taken into account to gauge power applied to the opposite side relative to power applied to and measured by the power meter side, to arrive at a relatively accurate estimation of the total amount of power applied to the bicycle.

For instance, when an accelerometer is used as the rotational characteristic sensor 53b, the acceleration of the pedal 35 or crank arm 39 is measured. If the measured acceleration is not equal for the downstroke of the power meter side and the downstroke of the opposite side, the side with a greater acceleration during the downstroke is the result of a greater amount of applied power. The differences in acceleration are then used to estimate the amount of power applied to the opposite side. This estimate of power applied to the opposite side is then used to provide a more accurate estimate of the total power exerted on both sides of the bicycle, while still using a single sided power meter system 5.

A brief description will follow regarding the use of acceleration to calculate the power exerted on both sides of the bicycle 7. As discussed above, other parameters could be measured and analyzed to calculate the force or power exerted on both sides of the bicycle 7.

The calculations made to estimate the force exerted on a second side of the bicycle 7 using acceleration measurements require one primary assumption. In this regard, to account for any discrepancies between the acceleration of the downstroke of one side of the bicycle in comparison to the other, it is assumed that all forces resisting the bicycle's forward movement would remain constant during each given crank revolution. This assumption is based on the fact that exterior forces such as road friction, grade, aerodynamic drag, barometric pressure, etc. likely remain fairly constant over the course of travel of the bicycle during a single crank, revolution. Under this assumption, the change in acceleration is linearly proportional to the mass of the rider. The following equations demonstrate the relationship between the various forces and help to demonstrate the relationships between the measurements taken by the single sided power meter system 5.

$$\text{Sum of Forces} = \text{Force}_{User} + \text{Force}_{Friction} + \text{Force}_{Aerodynamic\ Drag} + \text{Force}_{Gravity}$$

$$\text{Sum of Forces} = \text{Mass} * \text{Acceleration}$$

Consider two points in time within a particular crank revolution, T1 and T2

$$\text{Force}_{User\ T1} + \text{Force}_{Friction\ T1} + \text{Force}_{Aerodynamic\ Drag\ T1} + \text{Force}_{Gravity\ T1} = \text{Mass} * \text{Acceleration}_{T1}$$

$$\text{Force}_{User\ T2} + \text{Force}_{Friction\ T2} + \text{Force}_{Aerodynamic\ Drag\ T2} + \text{Force}_{Gravity\ T2} = \text{Mass} * \text{Acceleration}_{T2}$$

Again assuming that resistive forces ($\text{Force}_{Friction} + \text{Force}_{Aerodynamic\ Drag} + \text{Force}_{Gravity}$) are the same at both points in time:

$$\text{Mass} * \text{Acceleration}_{T1} - \text{Force}_{User\ T1} \text{Mass} * \text{Acceleration}_{T2} - \text{Force}_{User\ T2}$$

Therefore:

$$\text{Force}_{User\ T2} = \text{Mass} * \text{Acceleration}_{T1} - \text{Force}_{User\ T1} - \text{Mass} * \text{Acceleration}_{T2}$$

Based on the above, the force exerted on the second side of the bicycle 7, $\text{Force}_{User\ T2}$, can be calculated based on the mass of the user (input into the processor device described below), the acceleration of the downstroke as measured by the single sided power meter system 5 ($\text{Acceleration}_{T1}$), the force of the downstroke as measured by the single sided power meter system 5 ($\text{Force}_{User\ T1}$), and the acceleration of the upstroke as measured by the single sided power meter system 5 ($\text{Acceleration}_{T2}$).

To transmit the measurements and data from the single sided power meter system 5, the power meter system 5 may include a wired or wireless transmitter. The transmitter collects measurement data, for instance of force, angular velocity, acceleration, or other parameters, and transmits these values to evaluation processor device, such as computer 54 (FIG. 1), which is mounted to the bicycle 7 or carried by the bicyclist, and which may include a display for providing real-time feedback. Alternatively, the measured data could be stored in internal memory found within the single sided power meter system 5. As another alternative, the power meter system 5 may itself include a processor that receives and processes the measured data and then outputs power and other data to the bicycle computer 54. In any event, the measured data is input to a processor device that employs the data in performing calculations, for instance such as those outlined above, to calculate the power exerted on each side of the bicycle 7 and thereby total applied power. As an alternative to a dedicated bicycle computer 54, the processor device could be an application that runs on a smart phone. Further still, the processor device could be used with an athletic watch, which would also allow a bicyclist to track progress in real time. In addition, the processor device could be a personal computer. Other processor devices could be used to calculate and display the power applied by each kg and total estimated power, as would be known in the art.

Figure 4:
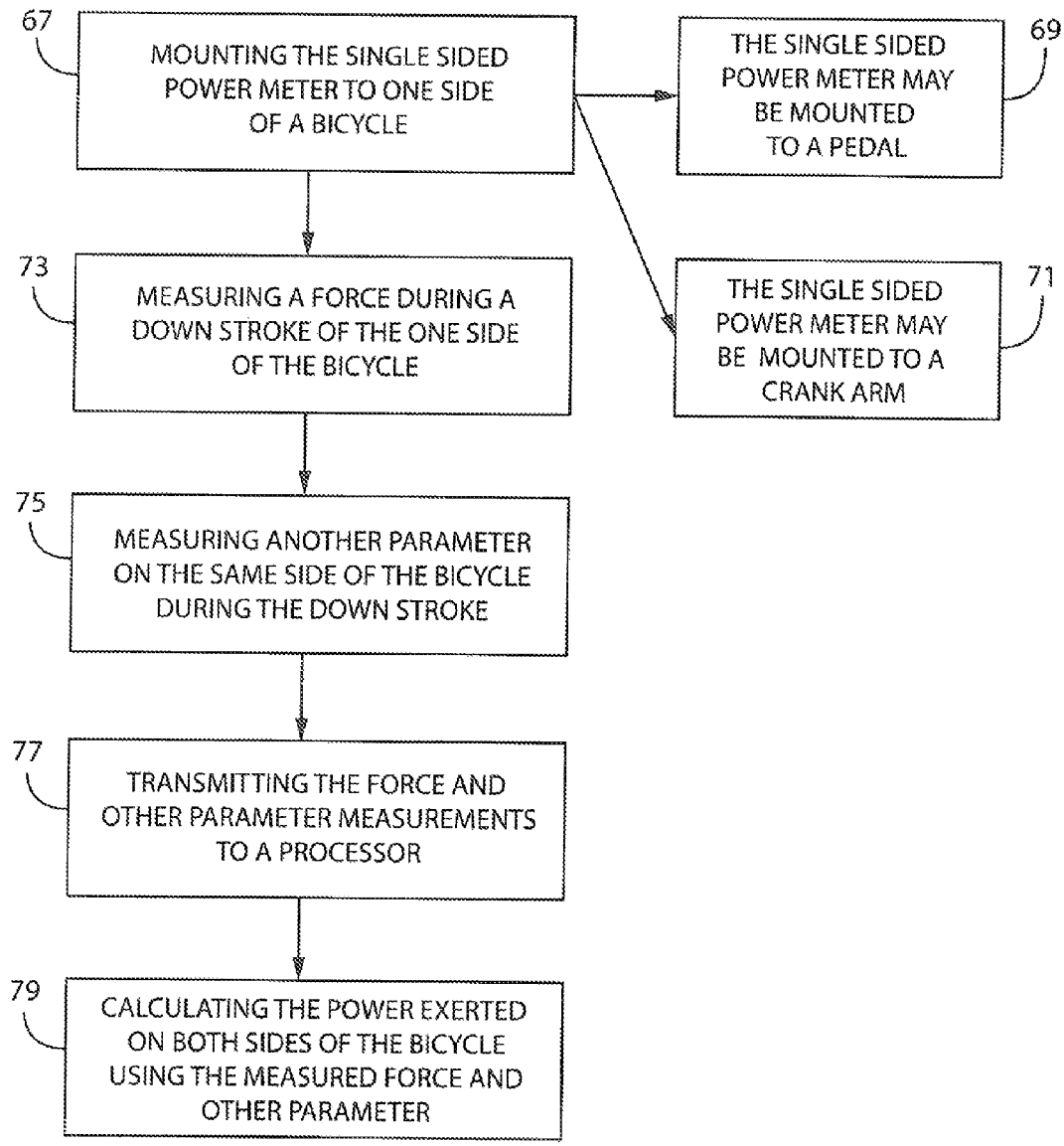
FIG. 4 is a flow chart of a method of estimating total power input using a single sided power meter system such as of the type illustrated in FIGS. 1, 2, and 3.

Referring now to FIG. 4, a block form representation of a method for using a single sided power meter system 5 to estimate total applied power is shown. First, as shown at block 67, the single sided power meter system 5 is mounted to one side of a bicycle 7. The single sided power meter system 5 could be mounted to a pedal 35 as shown at block 69 or alternatively to a crank arm 37 as shown at block 71 or in any other location, as noted above. A force on the downstroke of the power meter side of the bicycle is then measured as shown at block 73. Other parameters, such as angular velocity, acceleration, momentum, angular momentum, orientation, position of the pedal 35, are measured during the downstroke and the up stoke as shown at block 75. Data relating to the measured force and other parameters is then transmitted to evaluation processor device as shown at block 77. The processor device then employs the measured force and other parameters to calculate the power exerted on the power meter side as shown at block 79, estimate the power exerted on the opposite side, and arrive at a relatively accurate estimate of total power applied to both sides of the bicycle 7.

Figure 5:
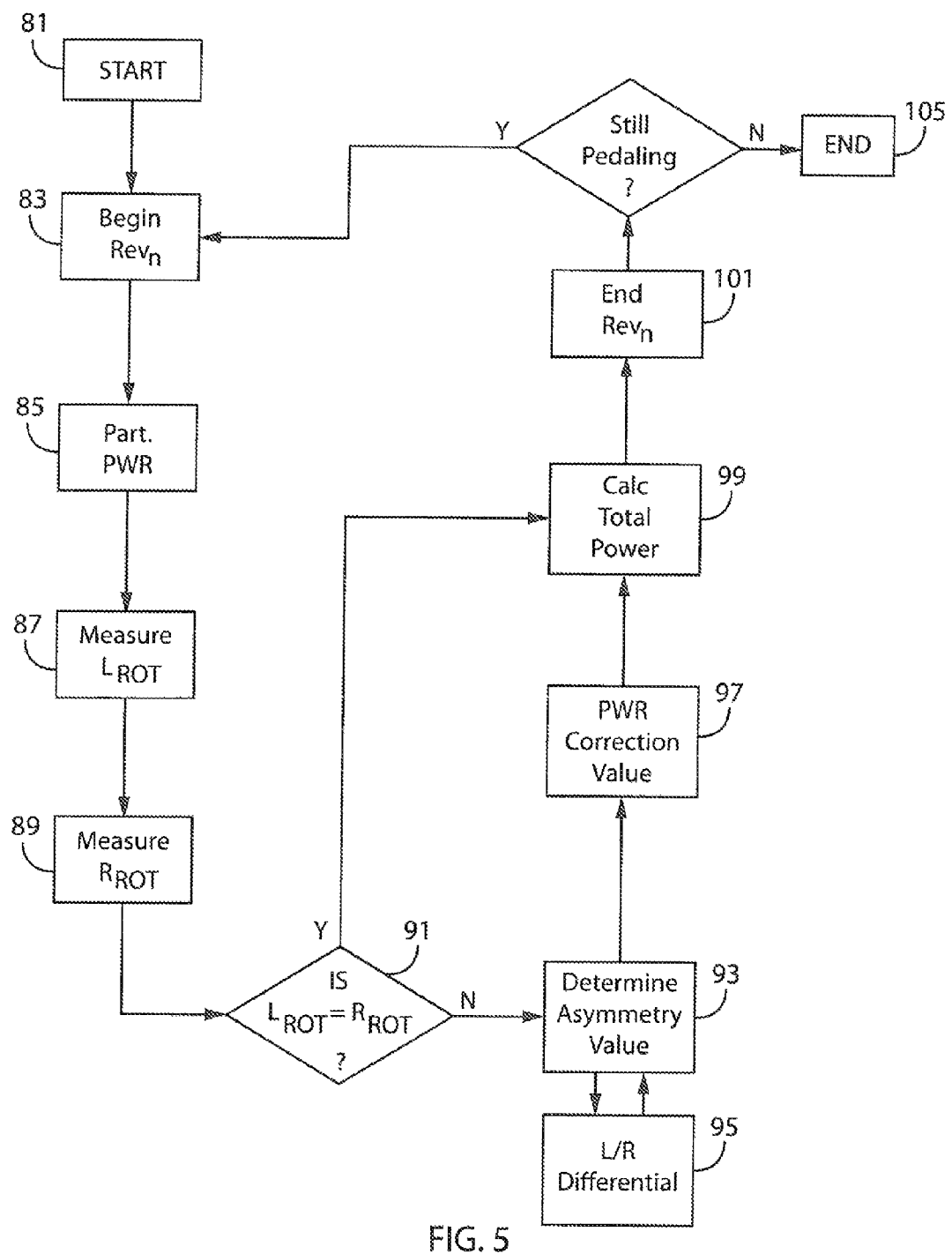
FIG. 5 is another flow chart of a method of estimating total power input using a single sided power meter system such as of the type illustrated in FIGS. 1, 2, and 3.

Referring now to FIG. 5 and with background reference to FIG. 1, another block diagram representing a method for using a single sided power meter system 5 to estimate total applied power is shown. As represented at block 81, the estimation process for determining total power begins, which may include turning on computer 54 and selecting a power meter feature for display or data logging. As represented at block 83, the bicyclist starts pedaling and begins a first pedaling revolution. As represented at block 85, the single sided power meter system 5 determines a partial power value through measurements made by single sided power measuring system 49. The partial power value may correspond to power exerted by only one leg of the bicyclist.

As represented at blocks 87 and 89, rotational characteristics on both sides of the bicycle 7 are determined by measuring pedaling rotational performance characteristics of the left and right legs of the bicyclist through rotational characteristic measuring system 51. The measurements can include measuring angular velocity or acceleration of rotating components at the left and right sides of the bicycle 7. The left and right side measurements can be made separately or on a single side of the bicycle 7. Measuring a single side of the bicycle 7 can include measuring acceleration during a downstroke of a single pedal 35, 37 or crank arm 39, 41 to represent the corresponding side acceleration value and measuring acceleration of the same single pedal 35, 37 or crank arm 39, 41 during the upstroke to indirectly represent the acceleration value of the other side.

As represented at block 91, single sided power meter system 5 evaluates the side to side rotational characteristic values to determine whether there is pedaling asymmetry. If the left side and right side rotational characteristic values are the same, then the pedaling is symmetrical and no asymmetric correction is required. If the left side and right side rotational characteristic values are not the same, then the bicyclist is pedaling asymmetrically. As represented at block 93, an asymmetry value is determined that corresponds to a difference between power exerted by the left and right legs of the bicyclist.

The asymmetry value may be determined by a side-to-side acceleration differential value based on measurements of the rotational characteristic measuring system 51, as represented at block 95. As represented at block 97, single sided power meter system 5 determines a power correction value that corresponds to the asymmetry value. The power correction value allows for compensating for the pedaling asymmetry to assign an appropriate weighted value of the measured partial power to account for which leg is delivering more power and how much more power it is delivering. As represented at block 99, single sided power meter system 5 calculates total power as an estimate based on evaluation at only one side of the bicycle 7. This is done by using partial power measurement and correction values to determine the total power value by way of, for example, using the formulas or formulas derived from those shown elsewhere herein. As represented at block 101, these calculations occur during the single pedaling revolution that started at block 83. When that pedaling revolution ends at block 101, as represented at block 103, if the bicyclist is still pedaling, then the procedure and calculations proceed for the new pedaling revolution back at block 83. If the bicyclist is no longer pedaling, then the process ends as represented at block 105.

Various alternatives and embodiments are contemplated as being within the scope of the following claims particularly pointing out and distinctly claiming the subject matter regarded as the invention.

We claim:

1. A method for determining total power of a bicyclist while riding a bicycle, comprising:
    determining a partial power value corresponding to power exerted by only one of a left leg and a right leg of a bicyclist by measuring power exerted by only one of the left leg or the right leg of the bicyclist without measuring power exerted by the other of the left leg or the right leg of the bicyclist;
    determining an asymmetry value corresponding to a difference between power exerted by the left and right legs of the bicyclist by measuring parameters other than power of both the left and right legs of the bicyclist;
    determining a power correction value corresponding to the asymmetry value; and
    determining a total power value based on the partial power value and the power correction value.

2. A method for determining total power of a bicyclist while riding a bicycle, comprising:
    determining a partial power value corresponding to power exerted by only one of a left leg and a right leg of a bicyclist;
    determining an asymmetry value corresponding to a difference between power exerted by the left and right legs of the bicyclist, wherein determining the asymmetry value comprises determining a left side-to-right side acceleration differential value by measuring acceleration values for left-side pedal strokes and right-side pedal strokes and determining a differential value between the left-side pedal strokes and right-side pedal strokes
    determining a power correction value corresponding to the asymmetry value; and
    determining a total power value based on the partial power value and the power correction value.

3. The method of claim 2, wherein the left side-to-right side acceleration differential value is determined as the differential value between the left-side pedal strokes and right-side pedal strokes during a single pedal revolution.

4. The method of claim 3, wherein the left side-to-right side acceleration differential value is determined by measuring acceleration at only one of the left and right legs of the bicyclist during the single pedal revolution, wherein the one of the left and right legs of the bicyclist of which acceleration is measured defines an evaluated leg, and the other one of the left and right legs of the bicyclist of which acceleration is not measured defines a non-evaluated leg, and wherein the left side-to-right side acceleration differential value is determined by:
    directly determining the acceleration value of the evaluated leg by measuring acceleration of the evaluated leg during a downstroke of the evaluated leg during the single pedal revolution;
    indirectly determining the acceleration value of the non-evaluated leg by measuring acceleration of the evaluated leg during an upstroke of the evaluated leg during the single pedal revolution; and
    comparing the acceleration values of the evaluated and non-evaluated legs to determine the left side-to-right side acceleration differential value.

5. The method of claim 4, wherein the measuring acceleration of the evaluated leg includes measuring acceleration of at least one of a crank arm and a pedal at a side of the bicycle at which the evaluated leg of the bicyclist is positioned.

6. The method of claim 4, wherein the determining a partial power value includes evaluating a signal from a power sensor arranged at a shoe of the bicyclist.

7. The method of claim 6, wherein the power sensor arranged at the shoe of the bicyclist is incorporated into at least one of an insole of the shoe and a cleat of the shoe.

8. The method of claim 4, wherein the determining a partial power value includes evaluating a signal from a power sensor arranged at a bottom bracket of the bicycle.

9. The method of claim 8, wherein the power sensor is configured to measure twist of a bottom bracket spindle at the bottom bracket of the bicycle.

10. The method of claim 4, wherein the determining a partial power value includes evaluating a signal from a power sensor arranged at a chain stay of a frame of the bicycle.

11. A method of estimating total power applied to a bicycle using a single sided power meter system comprising:
    interconnecting the single sided power meter with a first side of the bicycle without interconnecting a power meter with a second side of the bicycle,
    measuring a force on the first side of the bicycle using only the single sided power meter,
    measuring one or more operating parameters other than force on the first side of the bicycle, and
    calculating the power exerted on both sides of the bicycle using the measured force on the first side of the bicycle and the one or more operating parameters other than force on the first side of the bicycle.

12. The method of claim 1, wherein determining the asymmetry value comprises determining a left side-to-right side acceleration differential value by measuring acceleration values for left-side pedal strokes and right-side pedal strokes and determining a differential value between the left-side pedal strokes and right-side pedal strokes.

13. The method of claim 12, wherein the left side-to-right side acceleration differential value is determined as the differential value between the left-side pedal strokes and right-side pedal strokes during a single pedal revolution.

14. The method of claim 13, wherein the left side-to-right side acceleration differential value is determined by measuring acceleration at only one of the left and right legs of the bicyclist during the single pedal revolution, wherein the one of the left and right legs of the bicyclist of which acceleration is measured defines an evaluated leg, and the other one of the left and right legs of the bicyclist of which acceleration is not measured defines a non-evaluated leg, and wherein the left side-to-right side acceleration differential value is determined by:
    directly determining the acceleration value of the evaluated leg by measuring acceleration of the evaluated leg during a downstroke of the evaluated leg during the single pedal revolution;
    indirectly determining the acceleration value of the non-evaluated leg by measuring acceleration of the evaluated leg during an upstroke of the evaluated leg during the single pedal revolution; and comparing the acceleration values of the evaluated and non-evaluated legs to determine the left side-to-right side acceleration differential value.

15. The method of claim 14, wherein the measuring acceleration of the evaluated leg includes measuring acceleration of at least one of a crank arm and a pedal at a side of the bicycle at which the evaluated leg of the bicyclist is positioned.

16. The method of claim 14, wherein the determining a partial power value includes evaluating a signal from a power sensor arranged at a shoe of the bicyclist.

17. The method of claim 16, wherein the power sensor arranged at the shoe of the bicyclist is incorporated into at least one of an insole of the shoe and a cleat of the shoe.

18. The method of claim 14, wherein the determining a partial power value includes evaluating a signal from a power sensor arranged at a bottom bracket of the bicycle.

19. The method of claim 18, wherein the power sensor is configured to measure twist of a bottom bracket spindle at the bottom bracket of the bicycle.

20. The method of claim 14, wherein the determining a partial power value includes evaluating a signal from a power sensor arranged at a chain stay of a frame of the bicycle.

* * * * *